US012260270B2

(12) United States Patent
Li et al.

(10) Patent No.: US 12,260,270 B2
(45) Date of Patent: Mar. 25, 2025

(54) IDEMPOTENT EVENT HANDLING

(71) Applicant: SAP SE, Walldorf (DE)

(72) Inventors: You Li, Shanghai (CN); Zhenji Yang, Shanghai (CN); Junhui He, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/204,614

(22) Filed: Jun. 1, 2023

(65) Prior Publication Data

US 2024/0403145 A1 Dec. 5, 2024

(51) Int. Cl.
*G06F 9/54* (2006.01)
*H04L 41/06* (2022.01)
*H04L 41/0686* (2022.01)
*H04L 67/1004* (2022.01)
*H04L 67/1023* (2022.01)
*H04L 67/63* (2022.01)

(52) U.S. Cl.
CPC .............. *G06F 9/542* (2013.01); *H04L 41/06* (2013.01); *H04L 41/0686* (2013.01); *H04L 67/1004* (2013.01); *H04L 67/1023* (2013.01); *H04L 67/63* (2022.05); *G06F 9/544* (2013.01)

(58) Field of Classification Search
CPC ......... G06F 9/542; G06F 9/544; H04L 41/06; H04L 41/0686; H04L 67/1004; H04L 67/1023; H04L 67/63
See application file for complete search history.

(56) References Cited

U.S. PATENT DOCUMENTS

| 5,717,614 A * | 2/1998 | Shah ................... G06F 9/45537 |
| | | 702/186 |
| 9,274,863 B1 * | 3/2016 | Qiu ..................... G06F 11/1474 |
| 11,429,460 B1 * | 8/2022 | Freeburg, II ............ G06F 9/466 |
| 2002/0026502 A1 * | 2/2002 | Phillips ................... H04L 65/40 |
| | | 709/219 |

(Continued)

OTHER PUBLICATIONS

AWS, "What is an Event-Driven Architecture?", published Nov. 5, 2019, https://aws.amazon.com/event-driven-architecture/ (Year: 2019).*

*Primary Examiner* — Ramy M Osman
(74) *Attorney, Agent, or Firm* — SCHWEGMAN LUNDBERG & WOESSNER, P.A.

(57) ABSTRACT

A partition-based method to implement idempotence in an event-driven architecture is provided, which acts to reduce the pressure of database reading and writing, thus improving the performance of event handling. In order to improve parallelism, a consumer cluster (a cluster of multiple consumers that can share the responsibility of processing events) is established such that the events are distributed among different partitions within the cluster. Each partition contains a different consumer worker (with its own cache). An event dispatch module is then used to dispatch events among the consumer workers in a way that keeps the load balanced. In an example embodiment, this is performed by generating a partition identification for an event based on a hash of the context identification of the session established between the user and the application when the event was generated, followed by a modulo operation based on the number of consumer workers in the cluster.

17 Claims, 5 Drawing Sheets

(56) References Cited

U.S. PATENT DOCUMENTS

| | | | |
|---|---|---|---|
| 2004/0148283 A1* | 7/2004 | Harris | G06F 9/542 |
| | | | 707/999.005 |
| 2007/0198777 A1* | 8/2007 | Reinertsen | G06F 12/0875 |
| | | | 711/118 |
| 2008/0072239 A1* | 3/2008 | Liang | G06F 11/3495 |
| | | | 719/311 |
| 2009/0228903 A1* | 9/2009 | Che | G06Q 10/10 |
| | | | 707/999.107 |
| 2015/0039999 A1* | 2/2015 | Chasman | H04L 67/02 |
| | | | 715/234 |
| 2015/0143053 A1* | 5/2015 | Quimbey | G06F 12/0888 |
| | | | 711/133 |
| 2017/0168879 A1* | 6/2017 | Dann | G06F 9/542 |
| 2018/0176070 A1* | 6/2018 | Shafiee | H04L 41/069 |
| 2019/0190986 A1* | 6/2019 | Mishra | H04L 67/1004 |
| 2019/0205185 A1* | 7/2019 | Alfred | H04L 67/12 |
| 2019/0310902 A1* | 10/2019 | Schneiter | H04L 41/06 |
| 2019/0361755 A1* | 11/2019 | Cote | G06F 9/5061 |
| 2021/0089422 A1* | 3/2021 | Kim | G06F 11/3079 |
| 2024/0378087 A1* | 11/2024 | Talwalkar | G06F 9/5072 |

\* cited by examiner

IDEMPOTENT EVENT HANDLING

TECHNICAL FIELD

This document generally relates to computer systems. More specifically, this document relates to the handling of events in a computer system.

BACKGROUND

In a computer system, events are generated in response to one or more actions occurring in the computer system. An event is a data record expressing a change in a state and its surrounding context. Typically, events contain at least two types of information: the event data representing the occurrence and context metadata providing contextual information about the occurrence. In a networking environment, events are typically routed from an event producer (the source) to interested event consumers (applications or devices who have indicated an interest in knowing about particular types of events).

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

An event-driven architecture is a software architecture pattern that emphasizes the production, detection, consumption, and reaction to events that occur within a computer system. In an event-driven architecture, the components of a software system are designed to respond to events, which can be triggered by internal or external factors, such as user actions, sensor readings, or messages from other systems.

In this architecture, events are typically represented as messages that contain information about the occurrence of a specific action or state change. These messages are sent between different components of the system, allowing them to communicate and coordinate their actions based on the events they receive.

The key benefit of event-driven architecture is its ability to support loosely coupled and highly scalable systems. By relying on events to trigger actions, individual components can be developed and deployed independently, and the overall system can be easily scaled up or down to meet changing demands.

Idempotence in an event-driven architecture refers to the property that ensures that processing an event multiple times will have the same result as processing it once. In other words, if the same event is received and processed multiple times, the system will produce the same outcome as it did the first time the event was processed.

This property is particularly important in event-driven systems where events can be duplicated due to network or system failures. In such cases, an idempotent system ensures that duplicate events are identified and discarded or processed in a way that does not result in incorrect or inconsistent outcomes.

For example, in a payment processing system, if a payment event is processed twice due to a network failure, an idempotent system would ensure that the payment is only processed once and that the resulting outcome is the same as if the payment was processed only once. In another example, in an email service, because of common network flag and retry mechanisms, an event producer may send a single email event to an event consumer (or multiple event consumers) multiple times if a problem occurred during transmission of the communication, causing users to receive duplicate emails. Despite this, event consumers need to consume the email event exactly once to ensure idempotence.

One solution for implementing idempotence in an event-driven architecture is to store the processing status of events in a central table. When an event is sent, the event consumer questions the status of the event in the central table, and then only processes the event if the status indicates that the event has not yet been processed. This solution, however, presents a technical problem in that the consumers need to scan the entire central table to check for duplicate events, which can be a very expensive operation, especially as the size of the computer system scales up. Additionally, consumers need to perform a write operation to the central table after they have processed the event, which creates congestion from all the consumers needing to do similarly, again especially as the system is scaled up. This all creates a downgrade in performance of the database hosting the central table as the number of events increases.

In an example embodiment, a partition-based method to implement idempotence in an event-driven architecture is provided, which acts to reduce the pressure of database reading and writing and thus improve the performance of event handling. In order to improve parallelism, a consumer cluster (a cluster of multiple consumers that can share the responsibility of processing events) is established and the events are distributed among different partitions within the cluster. Each partition contains a different consumer worker (with its own cache). An event dispatch module is then used to dispatch events among the consumer workers in a way that keeps the load balanced. In an example embodiment, this is performed by generating a partition identification for an event based on a hash of the context identification of the session established between the user and the application when the event was generated, followed by a modulo operation based on the number of consumer workers in the cluster.

A similar hash and modulo operation is performed to determine which of a plurality of segregation tables the event status is stored in, once the event is processed.

When a consumer operator receives an event, it then checks its cache to determine whether the event has already been processed. If the cache has no entry for that event, then the consumer operator queries the segregation table for the event to obtain the event status, and this event status is written into the cache. If the event has not been processed yet, then the consumer operator processes it and updates the status in the cache (which can then be synchronized with the segregation table for the event at a later time).

The result is that idempotence is ensured without the performance hit of utilizing a single central table for event status queries. Instead, different consumer operators can query only individual segregation tables that contain only a fraction of the information contained in a single central table, drastically improving performance.

Figure 1:
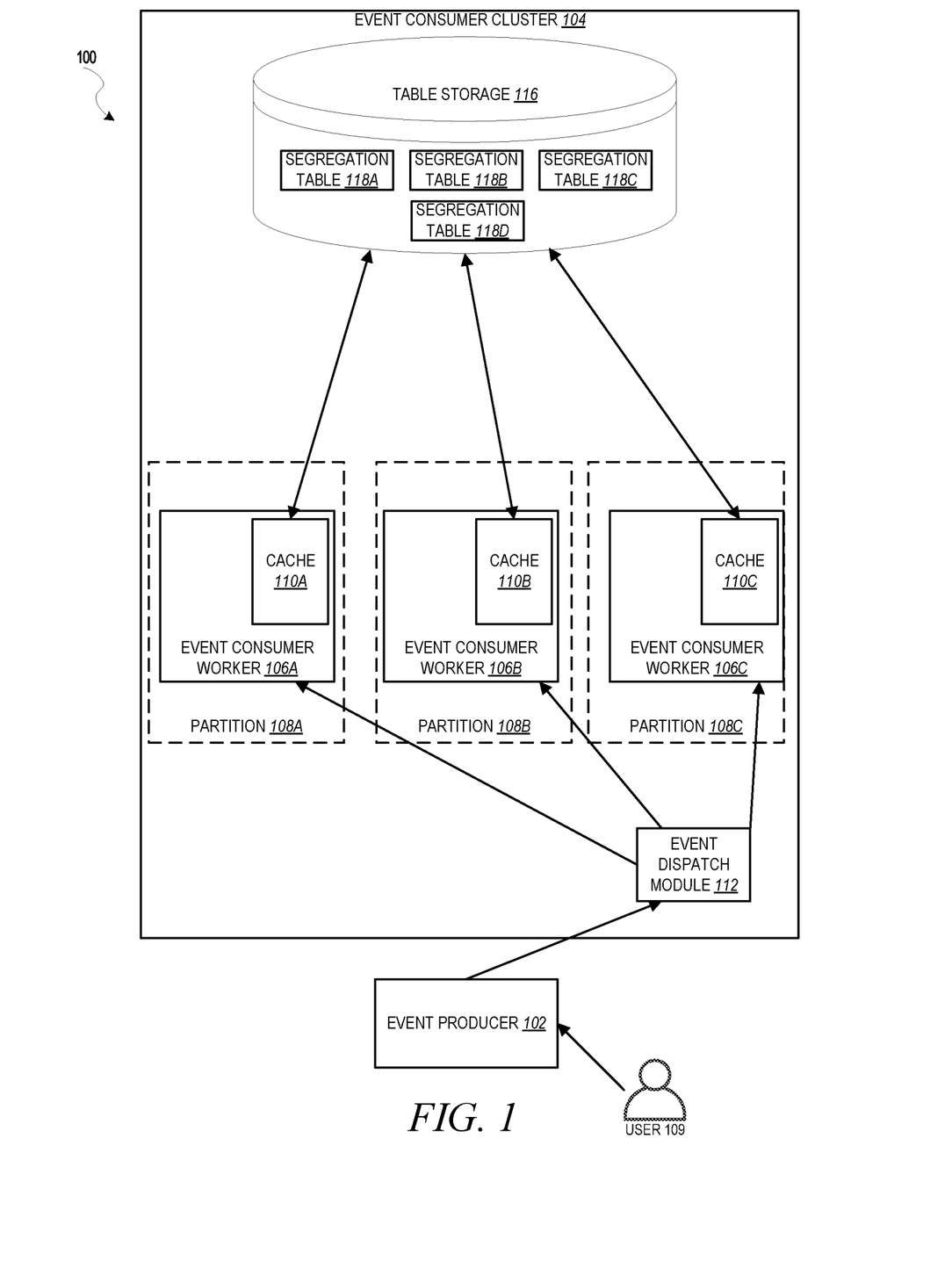
FIG. 1 is a block diagram illustrating a system for event processing in accordance with an example embodiment.

FIG. 1 is a block diagram illustrating a system 100 for event processing in accordance with an example embodiment. The system 100 includes at least one event producer 102 and at least one event consumer cluster 104. The event consumer cluster 104 contains a plurality of event consumer workers 106A, 106B, 106C. It should be noted that even though this figure depicts three consumer workers 106A, 106B, 106C, one of ordinary skill in the art will recognize that there could be any number of consumer workers in an event consumer cluster 104. Indeed, the formula which is used to determine to which consumer worker 106A, 106B, 106C to send the event uses the number of consumer workers as an input variable. Additionally, it should be noted that while in many cases the event consumer workers 106A, 106B, 106C in the consumer cluster 104 are located at the same geographical location, this is not mandatory and embodiments are possible where one or more of the event consumer workers 106A, 106B, 106C are geographically remote from the others.

Each consumer worker 106A, 106B, 106C can be considered to be a part of a separate partition 108A, 108B, 108C of the event consumer cluster 104. Each consumer worker 106A, 106B, 106C also contains a corresponding cache 110A, 110B, 110C, which will be described in more detail later.

When an event is generated by the at least one event producer 102, based upon actions taken by a user 109, a event dispatch module 112 is used to determine to which partition 108A, 108B, 108C to send the event. In this example embodiment, the event dispatch module 112 not only makes the determination about to which partition 108A, 108B, 108C to send the event but also actually sends the event to that partition 108A, 108B, 108C. In other example embodiments, the event dispatch module 112 does not send the event but the at least one event producer 102 sends it after learning which partition 108A, 108B, 108C the event dispatch module 112 determines the event should be sent to.

Determining to which partition 108A, 108B, 108C the event should be sent may be based on context information of the event. Specifically, the event dispatch module 112 may generate a context identification for the event, which is an identification of the session established between the user and the application whose actions cause the generation of the event. For example, if the event is a notification that a particular database entry has been changed, the context identification may be a session identifier for the session that occurred between the user who requested that the particular database entry be changed and the database application that received and processed that request.

In an example embodiment, the dispatch module 112 generates a partition identifier by hashing on the context identification, followed by a modulo operation based on the number of consumer workers 106A, 106B, 106C in the event consumer cluster 104. This formula may be represented as follows, where H represents the hash function, c is a context identification, n is the number of consumer workers in the event consumer cluster, and p is the partition identification:

$$p = H(c) \% n$$

Thus, the context identification is transformed into a target partition identification. Based on this, events can be accurately and evenly distributed among the partitions.

Figure 2:
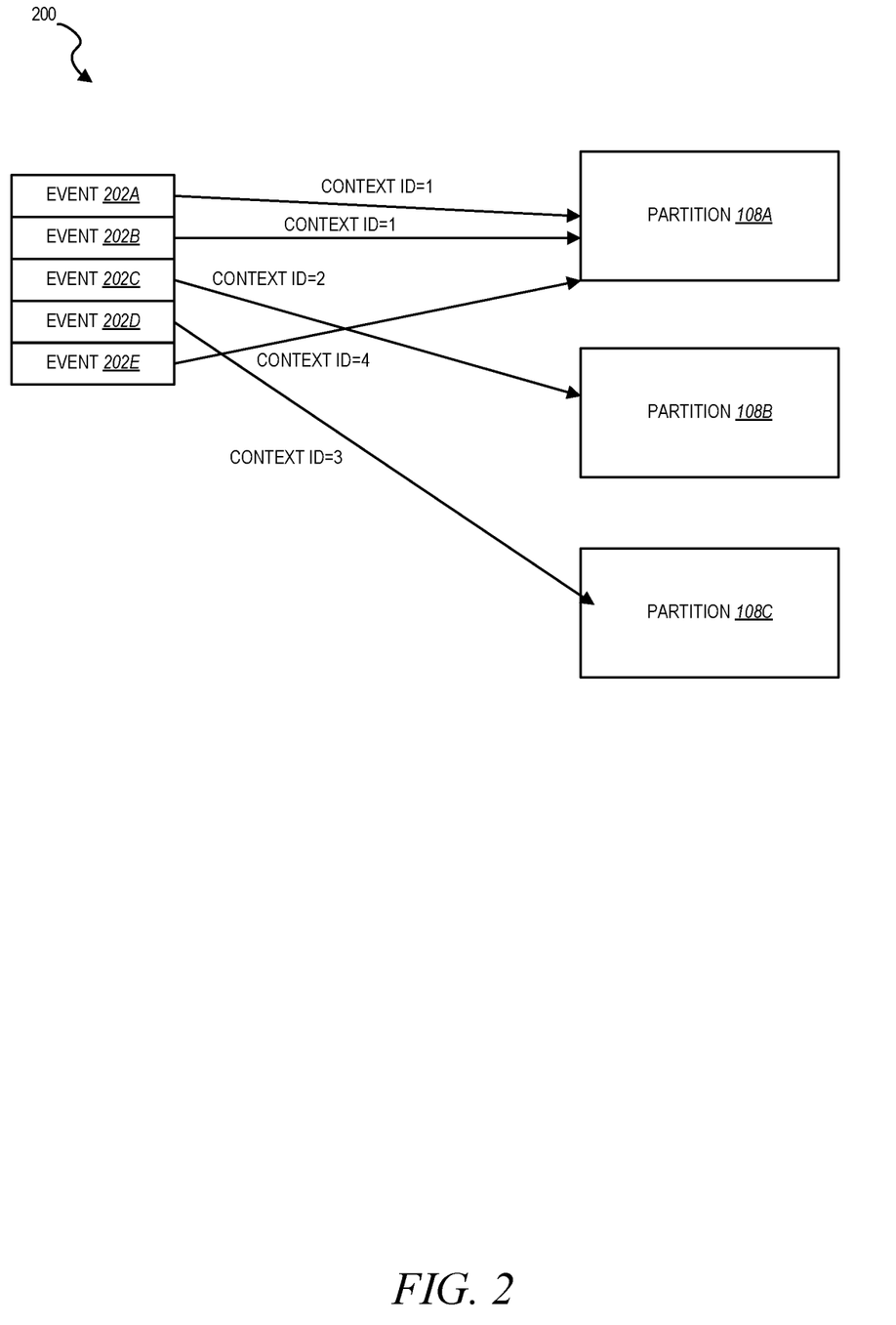
FIG. 2 is a block diagram illustrating the partition process in accordance with an example embodiment.

FIG. 2 is a block diagram illustrating the partition process 200 in accordance with an example embodiment. Here, there are five events 202A, 202B, 202C, 202D, and 202E. Events 202A and 202B were created in a single session, and thus have a shared context ID (1). Each of events 202C, 202D, and 202E were created in different sessions, and thus have their own context IDs (2, 3, and 4). There are three partitions 108A, 108B, 108C, and thus an event dispatch module 112 determines, based on the above formula, that events 202A, 202B, and 202E are sent to partition 108A, event 202C is sent to partition 108B, and event 202D is sent to partition 108C.

Referring back to FIG. 1, to reduce operations being performed on table storage 116 (which may be implemented as or in a database), in an example embodiment caches 110A, 110B, 110C are used to store information about processed events for their corresponding consumer worker 106A, 106B, 106C. When an event is sent to a consumer worker 106A, 106B, 106C, prior to processing the event the consumer worker 106A, 106B, 106C will check its local cache 110A, 110B, 110C to determine whether the same event has already been processed. If the cache indicates that the event has already been processed (e.g., a "cache hit"), then the corresponding consumer worker 106A, 106B, 106C will simply not process the event. If the cache, on the other hand, does not have such an indication (e.g., a "cache hit"), either because the cache is completely empty or because it simply does not contain an indication that this particular event has been processed, then the table storage 116 can be queried for the event processed status for the event. Assuming the table storage 116 then also indicates that the event has not been processed (e.g., the event is not contained in the table storage 116 then the consumer worker 106A, 106B, 106C processes the event.

After processing the event, the consumer worker 106A, 106B, 106C writes the event into the corresponding cache 110A, 110B, 110C with an indication that it has been processed. Periodically, the caches 110A, 110B, 110C are synchronized with the table storage 116. The interval of synchronization between the caches 110A, 110B, 110C and the table storage 116 is configurable. Furthermore, the caches 110A, 110B, 110C may have an eviction policy (or even multiple eviction policies—each cache 110A, 110B, 110C potentially having a different eviction policy or possibly multiple eviction policies used in different circumstances). One example eviction policy is First-In-First-Out (FIFO), although many other eviction policies can be utilized as well as or in lieu of FIFO, such as Least Recently Used, Most Recently Used, Least Frequently Used.

In an example embodiment, table storage 116 actually contains multiple different tables, called segregation tables 118A, 118B, 118C, 118D, to balance the read and write pressure on the table storage 116 and/or the database management system managing the table storage 116. Specifically, rather than having a single large table managing the statuses of all the events in the event consumer cluster 104, such a central table is essentially split into the different segregation tables 118A, 118B, 118C, 118D, with each segregation table 118A, 118B, 118C, 118D handling different (non-overlapping) events (based on session ID).

When performing a read or write on an event, the particular consumer worker 106A, 106B, 106C that needs to access the table storage 116 (either because it is synchronizing its corresponding cache 110A, 110B, 110C or it is writing an updated status of an event) will use the dispatch module 112 to determine which segregation table 118A, 118B, 118C, 118D to access. In an example embodiment, the dispatch module 112 bases this decision on the context identification for the event and the number of segregation tables 118A, 118B, 118C, 118D. More particularly, in an example embodiment, the dispatch module 112 bases this decision on the context identification modulo the number of tables.

The result is a system 100 that is much more efficient and reduces overloading situations on the table storage 116. Consider that there are $F_1$ events to process, a database query time for one event is $T_1$ and write time is $T_2$. Process time for one event is $T_3$, and suppose the time cost of finding a duplicate event is linearly related to the size of the dataset. So, the total process time will be:

$$\sum_{i=1}^{F_1-1} i \cdot T_1 + F_1(T_2 + T_3)$$

With the present system 100, assume that events will be separated into x partitions, and the caches 110A, 110B, 110C and table storage 116 are synchronized for every y events. The total process time will be:

$$\sum_{i=1}^{\frac{F_1}{x}-1} i \cdot T_1 x + \frac{F_1 T_2}{y} + F_1 T_3$$

For example: $F_1$=100, x=10 and y=10, the old method total process time is $4950T_1+100T_2+100T_3$, while the method total time of the present inventive subject matter is $450T_1+10T_2+100T_3$. The improvement will be $4500T_1+90T_2$.

Table 1 below is an example of a segregation table in accordance with an example embodiment. As can be seen, there is an event ID and an event status. There may be additional metadata fields describing the event, such as event type. The event status may have values such as processed, processing, and unprocessed, informing of the status of the processing of the event.

| Event ID | Event Type | Event Status |
|---|---|---|
| Event 1 | Field Change | Processed |
| Event 2 | Deletion | Processing |
| Event 3 | New Addition | Unprocessed |

In an example embodiment, the present solution is applied to an application server. More particularly, either the event producer 102 or the event consumer cluster 104 (or both) of FIG. 1 may be implemented on an application server. An application server is a type of software program that provides a platform for running and managing web-based applications. It typically provides a range of services and capabilities that are required to support the deployment and operation of these applications, such as web server functionality, database connectivity, security, load balancing, and clustering.

An application server acts as an intermediary between a client and a database, managing the flow of information between the two. When a client sends a request to the application server, the server retrieves the necessary data from the database, performs any required processing or calculations, and then sends the results back to the client in the form of an HTML page or other web-based format.

Application servers can be used to support a wide variety of web-based applications, including e-commerce sites, online banking systems, and enterprise resource planning (ERP) software. They are typically deployed in a distributed architecture, with multiple servers working together to provide high availability, scalability, and fault tolerance.

One specific example of an application server is the SAP Application Server from SAP SE of Walldorf, Germany.

SAP Application Server is a core component of the SAP system architecture, which enables the execution of SAP applications and provides the required infrastructure for managing and integrating the different components of the SAP system.

The SAP Application Server is designed to handle large amounts of data and processes, and can be configured to support a wide range of business operations. It comprises different components, including the Advanced Business Application Programming (ABAP) Application Server, the Java Application Server, and the Message Server.

The ABAP Application Server is responsible for executing ABAP-based applications, which are programs written in the ABAP programming language. The Java Application Server, on the other hand, is responsible for executing Java-based applications, which are programs written in the Java programming language.

The Message Server is responsible for managing communication between the different components of the SAP system, such as the application servers, the database servers, and the web servers.

The SAP Application Server provides various services, including application hosting, database connectivity, user management, system monitoring, and performance optimization. It also supports high availability and disaster recovery, ensuring that the SAP system can continue to operate even in the event of hardware or software failures.

It should be noted that in some example embodiments, machine learning may be used to further improve the system 100 of FIG. 1. Specifically, the number of segregation tables 118A, 118B, 118C, 118D may be set based on a recommendation from a machine learning model rather than set empirically by an administrator. When set empirically, an administrator may determine the number of segregation tables based on networking bottleneck metrics indicating how many segregation tables would be needed to minimize bottlenecks in table accesses from various requesting devices while also minimizing the amount of storage used by having too many segregation tables.

For example, a machine learning model may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the machine learning algorithm used to train the machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the machine learning model may take place as a dedicated training phase. In other example embodiments, the machine learning model may be retrained dynamically at runtime by the user providing live feedback.

The training data in this case may be historical information regarding executions use of the system 100 or similar systems in the past and specifically the load such systems 100 presented on the table storage 116. This load may be represented by one or more metrics indicative of database load, such as the time it took for the table storage 116 to perform read and write operations during peak usage, as well as the "cost" (in performance) of additional segregation tables. The machine learning model may be trained to identify an optimal number of segregation tables 118A, 118B, 118C, 118D in order to achieve improvements in processing efficiency.

Figure 3:
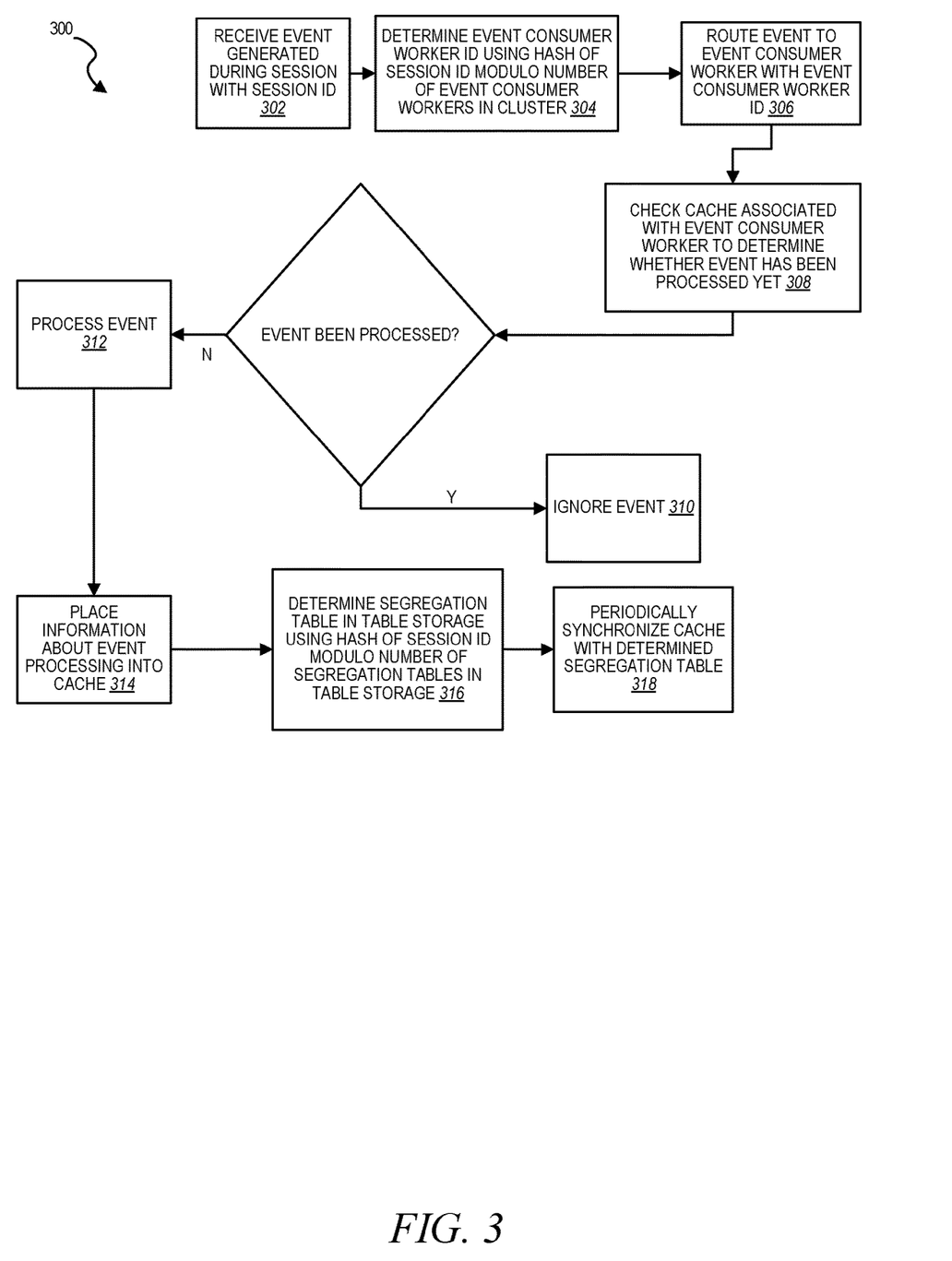
FIG. 3 is a flow diagram illustrating a method for handling an event in an event-driven architecture, in accordance with an example embodiment.

FIG. 3 is a flow diagram illustrating a method 300 for handling an event in an event-driven architecture, in accordance with an example embodiment. At operation 302, an event generated during a session with a session identification is received. At operation 304, an event consumer worker identification is determined using a hash of the session identification, modulo the number of event consumer workers in a cluster. At operation 306, the event is routed to the event consumer worker with the event consumer worker identification. At operation 308, a cache associated with the event consumer worker is checked to determine whether the event has been processed yet. If so, then at operation 310 the event is ignored.

If not, then at operation 312 the event consumer worker with the event consumer worker identification processes the event. At operation 314, results of the event processing are placed into the cache associated with the event consumer worker. At operation 316, a segregation table of a plurality of segregation tables in a table storage is determined using a hash of the session identification, modulo the number of segregation tables in the table storage. At operation 318, the cache is periodically synchronized with the determined segregation table.

In view of the disclosure above, various examples are set forth below. It should be noted that one or more features of an example, taken in isolation or combination, should be considered within the disclosure of this application.

Example 1.
  A system comprising:
  at least one hardware processor; and
  a computer-readable medium storing instructions that, when executed by the at least one hardware processor, cause the at least one hardware processor to perform operations comprising:
    receiving an event from an event producer in an event-driven architecture, the event generated during a session between a user and the event producer, the session having a session identification;
    determining a first event consumer worker from a plurality of different event consumer workers based on the session identification; and
    sending the event to the first event consumer worker for processing.

Example 2.
  The system of Example 1, wherein the first event consumer worker is determined by calculating a hash of the session identification modulo n, wherein n is a number of different event consumer workers.

Example 3.
  The system of Examples 1 or 2, wherein the first event consumer worker performs following operations comprising:
    checking a first cache associated with the first event consumer worker to determine whether the event has already been processed; and
    in response to a determination that the event has not already been processed, processing the event and writing results of the processing into the first cache.

Example 4.
  The system of any of Examples 1-3, wherein the first event consumer worker performs following operations comprising:
    checking a first cache associated with the first event consumer worker to determine whether the event has already been processed; and
    in response to a determination that the event has already been processed, not processing the event or writing results of the processing into the first cache.

Example 5.
  The system of any of Examples 3-4, wherein the first cache is periodically synchronized with a table storage, wherein the table storage includes m different segregation tables, each segregation table corresponding to a different set of one or more session identifications.

Example 6.
  The system of Example 5, wherein the periodically synchronizing comprises determining which segregation table to synchronize with the first cache based on a hash of the session identification modulo m., thereby reducing total processing time to process the event Example 7.
  The system of Example 6, wherein m is determined based on output of a machine learning model trained using training data including one or more metrics regarding processing times of the table storage.

Example 8.
  A method comprising:
    receiving an event from an event producer in an event-driven architecture, the event generated during a session between a user and the event producer, the session having a session identification;
    determining a first event consumer worker from a plurality of different event consumer workers based on the session identification; and sending the event to the first event consumer worker for processing.

Example 9.

The method of Example 8, wherein the first event consumer worker is determined by calculating a hash of the session identification modulo n.

Example 10.

The method of Example 8 or 9, wherein the first event consumer worker performs following operations comprising:

checking a first cache associated with the first event consumer worker to determine whether the event has already been processed; and in response to a determination that the event has not already been processed, processing the event and writing results of the processing into the first cache.

Example 11.

The method of any of Examples 8-10, wherein the first event consumer worker performs following operations comprising:

checking a first cache associated with the first event consumer worker to determine whether the event has already been processed; and in response to a determination that the event has already been processed, not processing the event or writing results of the processing into the first cache.

Example 12.

The method of any of Examples 10 or 11, wherein the first cache is periodically synchronized with a table storage, wherein the table storage includes m different segregation tables, each segregation table corresponding to a different set of one or more session identifications.

Example 13.

The method of Example 12, wherein the periodically synchronizing comprises determining which segregation table to synchronize with the first cache based on a hash of the session identification modulo m.

Example 14.

The method of Example 13, wherein the periodically synchronizing comprises determining which segregation table to synchronize with the first cache based on a hash of the session identification modulo m., thereby reducing total processing time to process the event Example 15.

A non-transitory machine-readable medium storing instructions which, when executed by one or more processors, cause the one or more processors to perform operations comprising:

receiving an event from an event producer in an event-driven architecture, the event generated during a session between a user and the event producer, the session having a session identification;

determining a first event consumer worker from a plurality of different event consumer workers based on the session identification; and sending the event to the first event consumer worker for processing.

Example 16.

The non-transitory machine-readable medium of Example 15, wherein the first event consumer worker is determined by calculating a hash of the session identification modulo n.

Example 17.

The non-transitory machine-readable medium of Examples 15 or 16, wherein the first event consumer worker performs operations comprising:

checking a first cache uniquely associated with the first event consumer worker to determine whether the event has already been processed; and in response to a determination that the event has not already been processed, processing the event and writing results of the processing into the first cache.

Example 18.

The non-transitory machine-readable medium of any of Examples 15-17, wherein the first event consumer worker performs following operations comprising:

checking a first cache associated with the first event consumer worker to determine whether the event has already been processed; and in response to a determination that the event has not already been processed, processing the event and writing results of the processing into the first cache.

Example 19.

The non-transitory machine-readable medium of any of Examples 15-18, wherein the first event consumer worker performs following operations comprising:

checking a first cache associated with the first event consumer worker to determine whether the event has already been processed; and in response to a determination that the event has already been processed, not processing the event or writing results of the processing into the first cache.

Example 20.

Figure 4:
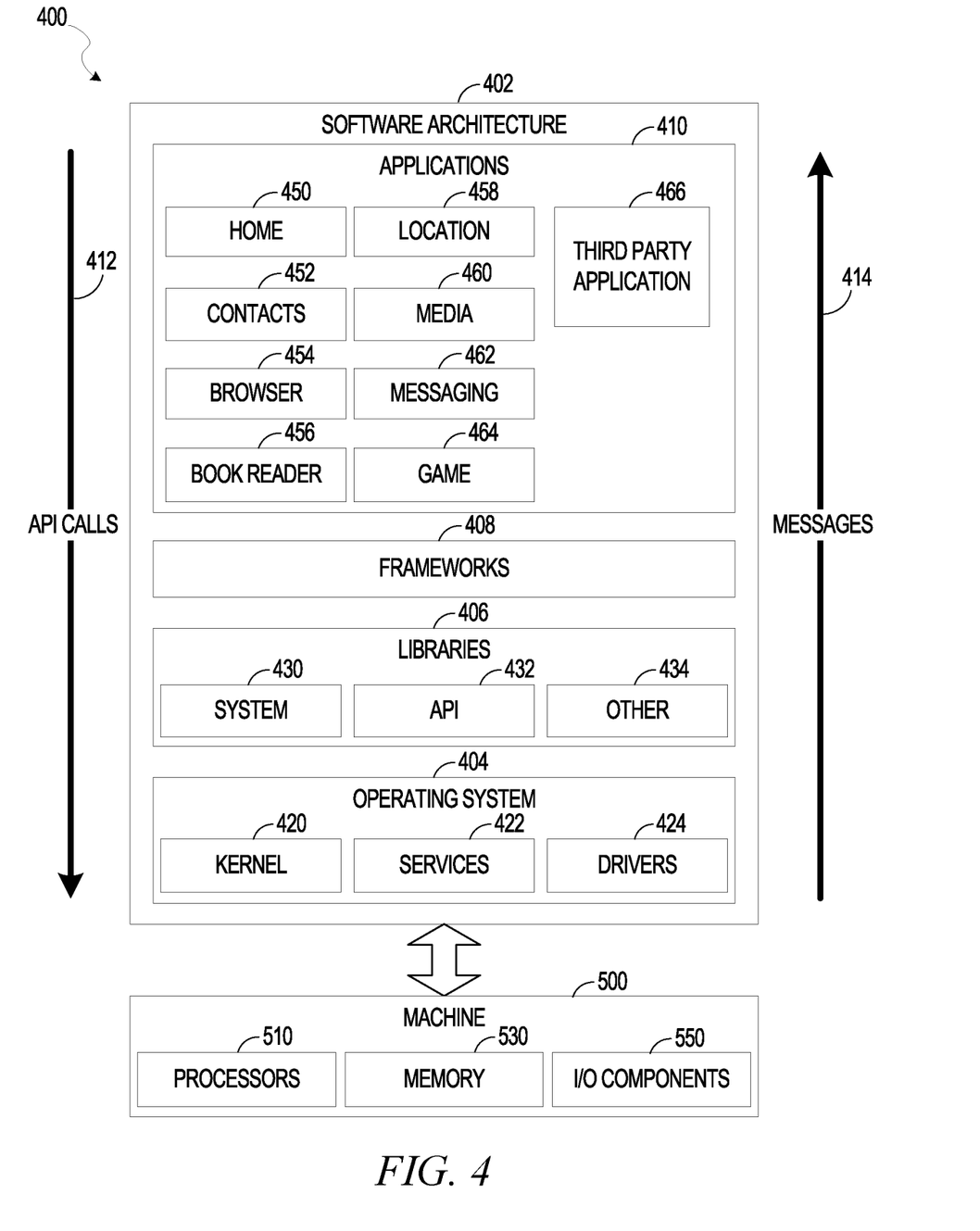
FIG. 4 is a block diagram illustrating an architecture of software, which can be installed on any one or more of the devices described above.

The non-transitory machine-readable medium of Example 19, wherein the periodically synchronizing comprises determining which segregation table to synchronize with the first cache based on a hash of the session identification modulo m., thereby reducing total processing time to process the event FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
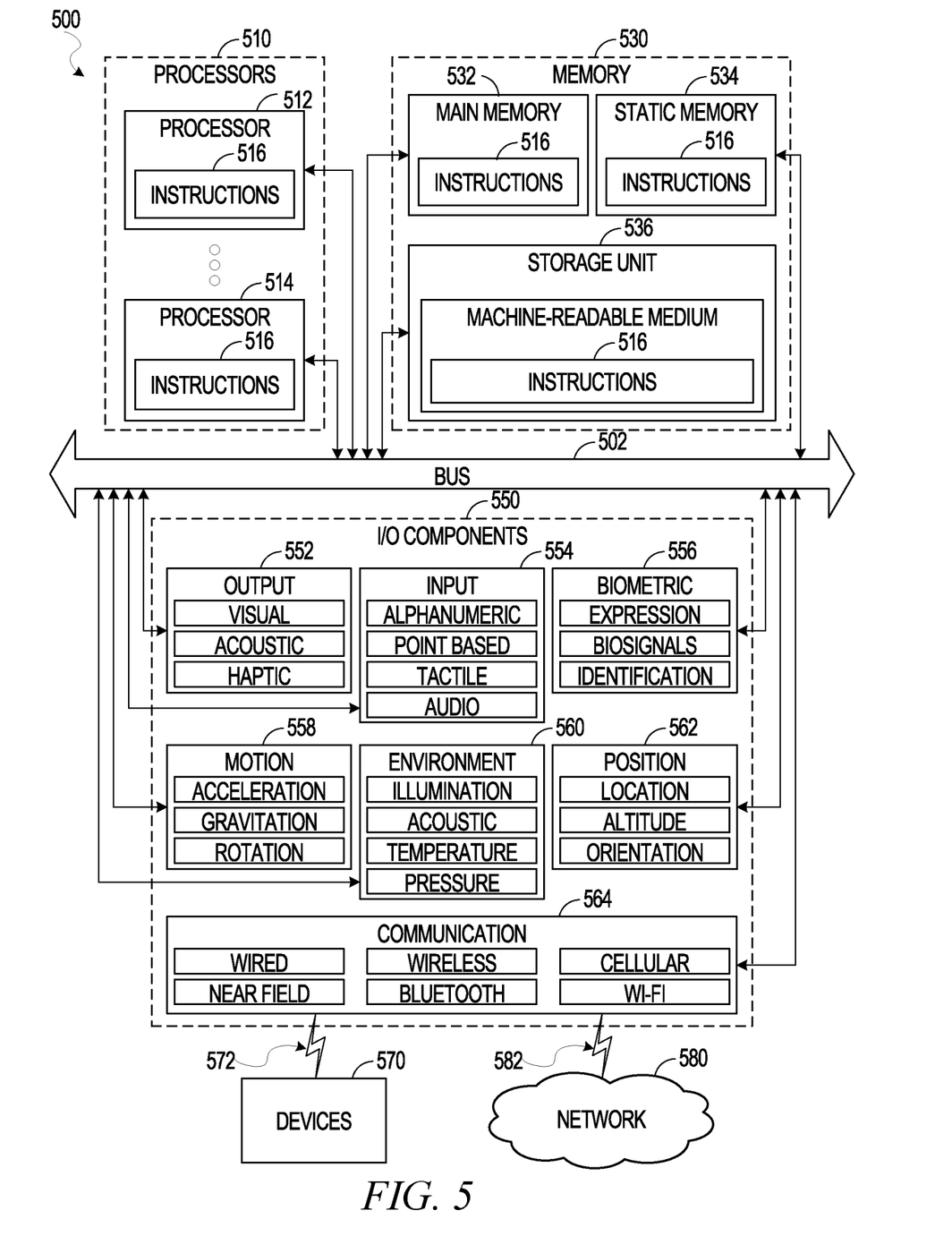
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving an event from an event producer in an event-driven architecture, the event generated during a first session established between a user and the event producer;
   generating a first session identification for the first session, the first session identification being different than a second session identification generated for a second session established between the user and the event producer;
   determining a first event consumer worker from a plurality of different event consumer workers based on calculating a hash of the first session identification and then performing a calculation of the hash modulo a defined number indicating an amount of different event consumer workers available to process the event; and
   sending the event, and other events that occur during the first session, to the first event consumer worker for processing.

2. The system of claim 1, wherein the first event consumer worker performs following operations comprising:
   checking a first cache associated with the first event consumer worker to determine whether the event has already been processed; and
   in response to a determination that the event has not already been processed, processing the event and writing results of the processing into the first cache.

3. The system of claim 2, wherein the first cache is periodically synchronized with a table storage, wherein the table storage includes m different segregation tables, each segregation table corresponding to a different set of one or more session identifications, wherein m is a positive integer indicating a quantity of different segregation tables.

4. The system of claim 3, wherein the periodically synchronizing comprises determining which segregation table to synchronize with the first cache based on a hash of a result of the session identification modulo m, thereby reducing total processing time to process the event.

5. The system of claim 4, wherein m is determined based on output of a machine learning model trained using training data including one or more metrics regarding processing times of the table storage.

6. The system of claim 1, wherein the first event consumer worker performs following operations comprising:
   checking a first cache associated with the first event consumer worker to determine whether the event has already been processed; and
   in response to a determination that the event has already been processed, not processing the event or writing results of the processing into the first cache.

7. A method comprising:
   receiving an event from an event producer in an event-driven architecture, the event generated during a first session established between a user and the event producer;
   generating a first session identification for the first session, the first session identification being different than a second session identification generated for a second session established between the user and the event producer;
   determining a first event consumer worker from a plurality of different event consumer workers based on calculating a hash of the first session identification and then performing a calculation of the hash modulo a defined number indicating an amount of different event consumer workers available to process the event; and
   sending the event, and other events that occur during the first session, to the first event consumer worker for processing.

8. The method of claim 7, wherein the first event consumer worker performs following operations comprising:
   checking a first cache associated with the first event consumer worker to determine whether the event has already been processed; and
   in response to a determination that the event has not already been processed, processing the event and writing results of the processing into the first cache.

9. The method of claim 7, wherein the first event consumer worker performs following operations comprising:

checking a first cache associated with the first event consumer worker to determine whether the event has already been processed; and in response to a determination that the event has already been processed, not processing the event or writing results of the processing into the first cache.

10. The method of claim 9, wherein the first cache is periodically synchronized with a table storage, wherein the table storage includes m different segregation tables, each segregation table corresponding to a different set of one or more session identifications.

11. The method of claim 10, wherein the periodically synchronizing comprises determining which segregation table to synchronize with the first cache based on a hash of a result of the session identification modulo m, wherein m is a positive integer indicating a quantity of different segregation tables.

12. The method of claim 11, wherein the periodically synchronizing comprises determining which segregation table to synchronize with the first cache based on a hash of a result of the session identification modulo m., thereby reducing total processing time to process the event.

13. A non-transitory machine-readable medium storing instructions which, when executed by one or more processors, cause the one or more processors to perform operations comprising:

receiving an event from an event producer in an event-driven architecture, the event generated during a first session established between a user and the event producer;

generating a first session identification for the first session, the first session identification being different than a second session identification generated for a second session established between the user and the event producer;

determining a first event consumer worker from a plurality of different event consumer workers based on calculating a hash of the first session identification and then performing a calculation of the hash modulo a defined number indicating an amount of different event consumer workers available to process the event; and sending the event, and other events that occur during the first session, to the first event consumer worker for processing.

14. The non-transitory machine-readable medium of claim 13, wherein the first event consumer worker performs operations comprising:

checking a first cache uniquely associated with the first event consumer worker to determine whether the event has already been processed; and in response to a determination that the event has not already been processed, processing the event and writing results of the processing into the first cache.

15. The non-transitory machine-readable medium of claim 13, wherein the first event consumer worker performs following operations comprising:

checking a first cache associated with the first event consumer worker to determine whether the event has already been processed; and in response to a determination that the event has not already been processed, processing the event and writing results of the processing into the first cache.

16. The non-transitory machine-readable medium of claim 13, wherein the first event consumer worker performs following operations comprising:

checking a first cache associated with the first event consumer worker to determine whether the event has already been processed; and in response to a determination that the event has already been processed, not processing the event or writing results of the processing into the first cache.

17. The non-transitory machine-readable medium of claim 16, wherein the first cache is periodically synchronized with a table storage, wherein the table storage includes m different segregation tables, each segregation table corresponding to a different set of one or more session identifications, wherein m is a positive integer indicating a quantity of different segregation tables.

* * * * *